(12) United States Patent
Surjaatmadja

(10) Patent No.: US 6,938,690 B2
(45) Date of Patent: Sep. 6, 2005

(54) DOWNHOLE TOOL AND METHOD FOR FRACTURING A SUBTERRANEAN WELL FORMATION

(75) Inventor: Jim B. Surjaatmadja, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 90 days.

(21) Appl. No.: 10/430,763

(22) Filed: May 6, 2003

(65) Prior Publication Data

US 2003/0234106 A1 Dec. 25, 2003

Related U.S. Application Data

(63) Continuation-in-part of application No. 09/966,128, filed on Sep. 28, 2001, now Pat. No. 6,662,872, and a continuation-in-part of application No. 09/966,630, filed on Sep. 28, 2001, now Pat. No. 6,725,933.

(51) Int. Cl.[7] .............................. E21B 17/20; E21B 7/08
(52) U.S. Cl. ..................... 166/242.2; 166/381; 175/67; 175/73
(58) Field of Search ............................. 166/242.2, 50, 166/381, 313, 117.5, 242.6; 175/73, 67

(56) References Cited

U.S. PATENT DOCUMENTS

| | | | |
|---|---|---|---|
| 2,802,537 A | 8/1957 | Goldinger | 166/224 |
| 3,892,274 A | 7/1975 | Dill | 166/222 |
| 4,044,833 A | 8/1977 | Volz | 166/307 |
| 4,453,596 A | 6/1984 | Conway et al. | 166/278 |
| 4,453,597 A | 6/1984 | Brown et al. | 166/303 |
| 4,615,564 A | 10/1986 | Garrett | 299/7 |
| 4,640,362 A * | 2/1987 | Schellstede | 166/298 |
| 4,730,676 A | 3/1988 | Luers et al. | 166/309 |
| 4,763,734 A * | 8/1988 | Dickinson et al. | 175/61 |
| 5,060,725 A | 10/1991 | Buell | 166/222 |
| 5,311,952 A * | 5/1994 | Eddison et al. | 175/61 |
| 5,361,856 A | 11/1994 | Surjaatmadja et al. | 175/67 |
| 5,494,103 A | 2/1996 | Surjaatmadja et al. | 166/222 |
| 5,499,678 A | 3/1996 | Surjaatmadja et al. | 166/298 |
| 5,765,642 A | 6/1998 | Surjaatmadja et al. | 166/297 |
| 6,142,246 A * | 11/2000 | Dickinson et al. | 175/67 |
| 6,213,205 B1 | 4/2001 | Surjaatmadja | 166/242.2 |
| 6,260,623 B1 * | 7/2001 | Schick | 166/313 |
| 6,325,305 B1 | 12/2001 | Kuhlman et al. | 239/548 |
| 6,394,184 B2 | 5/2002 | Tolman et al. | 166/281 |
| 6,401,818 B1 | 6/2002 | Papanastasiou | 166/297 |
| 2004/0089452 A1 | 5/2004 | Middaugh et al. | 166/309 |

FOREIGN PATENT DOCUMENTS

| | | | |
|---|---|---|---|
| EP | 0 851 094 A2 | 7/1998 | E21B/43/26 |
| FR | 0 229 434 A1 | 7/1987 | E21B/43/243 |
| WO | WO 02/23010 A1 | 3/2002 | E21B/43/26 |

OTHER PUBLICATIONS

SPE 48856 entitled "Hydrajet Fracturing: An Effective Method for Placing Many Fractures In Openhole Horizontal Wells" by J.B. Surjaatmadja et al., dated 1998.
Patent Application entitled "Method for Acid Stimulating A Subterranean Well Formation For Improving Hydrocarbon Production", U.S. Appl. No. 09/966,129, filed Sep. 28, 2002.
Patent Application entitled "System and Method For Fracturing A Subterranean Well Formation For Improving Hydrocarbon Production", U.S. Appl. No. 09/966,128, filed Sep. 28, 2001.
Foreign communication from a related counterpart application dated Oct. 5, 2004.

* cited by examiner

Primary Examiner—Frank Tsay
(74) Attorney, Agent, or Firm—John W. Wustenberg; Haynes and Boone, LLP

(57) ABSTRACT

A downhole tool for fracturing a subterranean formation according to which a tool having a plurality of discharge jets or nozzles is located in a spaced relation to a wall of the formation to form an annulus between the nozzles and the formation. An acid-containing, stimulation fluid is pumped at a predetermined pressure through the nozzles, into the annulus and against the wall of the formation. A gas is pumped into the annulus so that the stimulation fluid mixes with the gas to generate foam before the mixture is jetted towards the formation to impact the wall of the formation. The tool is adapted to bend, or tilt, so that the discharge jets can come in to proximity to the formation being fractured.

37 Claims, 6 Drawing Sheets

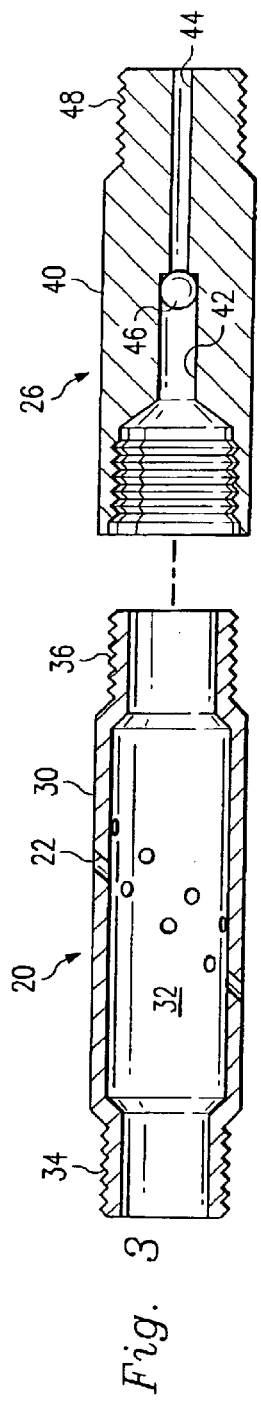
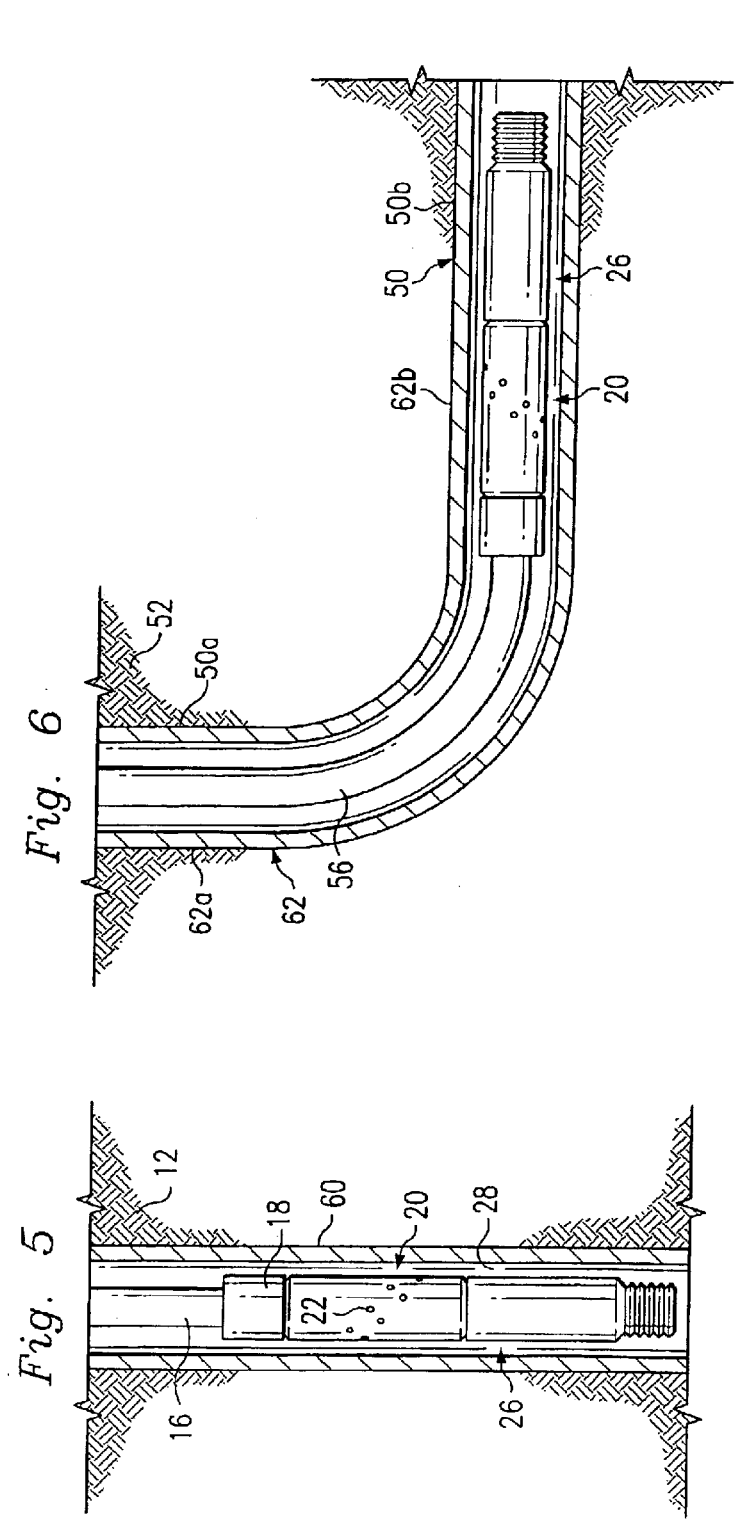

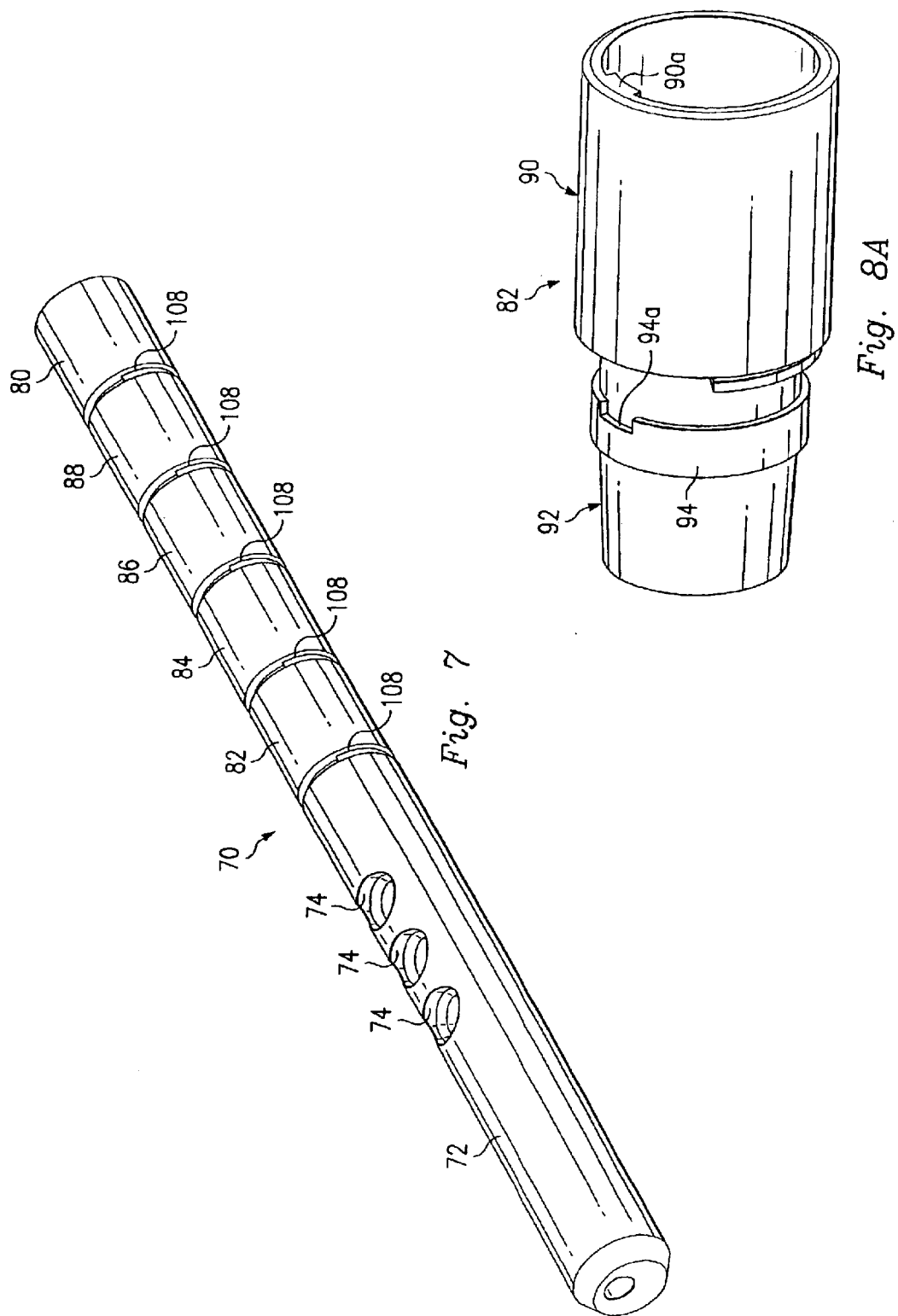

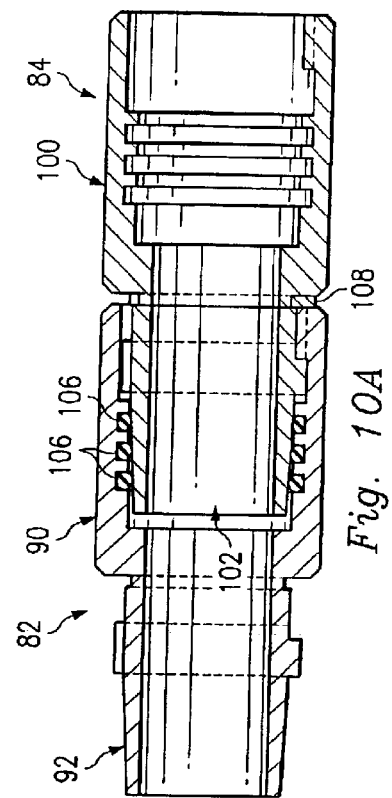
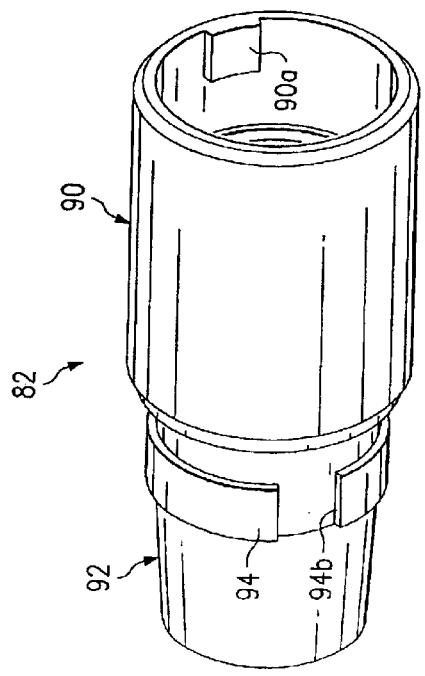
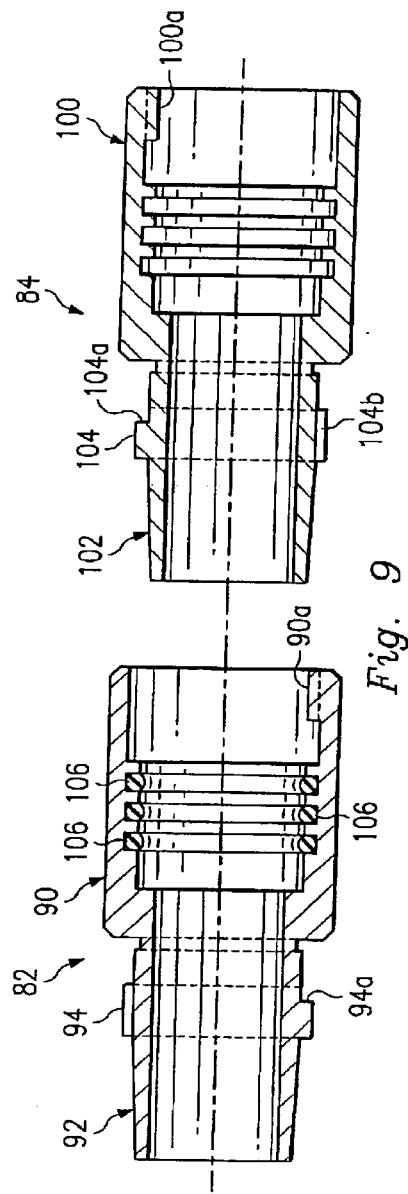

DOWNHOLE TOOL AND METHOD FOR FRACTURING A SUBTERRANEAN WELL FORMATION

CROSS REFERENCE TO RELATED APPLICATION

This application is a continuation-in-part of applications Ser. No. 09/966,128 now U.S. Pat. No. 6,662,872 and Ser. No. 09/966,630 now U.S. Pat. No. 6,725,933 both filed Sep. 28, 2001.

BACKGROUND

This disclosure relates to a method for treating a subterranean well formation to stimulate the production of hydrocarbons and, more particularly, such an apparatus and method for fracturing and squeezing the well formation.

Several techniques have evolved for treating a subterranean well formation to stimulate hydrocarbon production. For example, hydraulic fracture methods have often been used according to which a wellbore penetrates the formation to be stimulated, packers are installed to isolated a zone in the formation, and a stimulation fluid containing acids, gels, sand slurry, and the like, is pumped through the wellbore and discharged, usually through a jetting tool, or the like, at a relatively high velocity into the isolated portion of the formation. The pressurized stimulation fluid pushes against the formation at a very high force to establish and extend cracks on the formation.

Also, squeezing methods have been used which involve introducing stimulation fluids containing acids to the formations at a pressure that is higher than the formation pressure (but not as high as the fluid pressure in the fracturing methods), causing the fluid to infiltrate the pores in the formation and react with the formation to enlarge the pores. Since these stimulation fluids are usually very reactive, especially at elevated temperatures, the fluid is often prematurely spent close to the wellbore in the formation. Thus, no extended reach is achieved and the fluid-entry point is often greatly enlarged. As a result, it is difficult to form multiple, relatively long and effective acid fingering throughout the wellbore face, especially in low-permeability reservoirs that require deep penetration.

Additional problems encountered in these types of operations occur when the operation is carried out in relatively large diameter wellbores or casings, especially when the jetting tool has a relatively small diameter which is required when it is connected to relatively small diameter tubing, and/or when the tool has to be passed through relatively small diameter production tubing. In these situations, the tool, after being lowered to the proper height in the wellbore, is spaced a considerable distance from the inner surface of the wall of the wellbore or casing. Thus, the jetting effect is diminished, especially in connection with the squeezing methods discussed above, due to the fact that the jetted fluid has to travel a relatively long distance to the wall. In addition, the reaction forces caused by the jets tend to push the tool away from the wall; thus increasing this distance even further.

Therefore, what is needed is a stimulation treatment according to which the need for isolation packers is eliminated, the depth of penetration is improved, premature reaction of the acid with the formation is prevented, and the disadvantages of relatively small diameter jetting tools are eliminated.

BRIEF DESCRIPTION OF THE DRAWINGS

FIG. 3 is a cross-sectional view of the components of FIG. 2.

FIG. 5 is a view similar to that of FIG. 1 but depicting an alternate application of the fracturing apparatus of the present invention shown in a vertical wellbore.

FIG. 6 is a view similar to that of FIG. 5 but depicting the fracturing apparatus of the embodiment of FIG. 5 in a wellbore having a horizontal deviation.

FIG. 7 is an isometric view of an embodiment of a tool of the present invention.

FIG. 8A is an enlarged isometric view of a component of the embodiment of FIG. 1.

FIG. 8B is a view similar to that of FIG. 8A but depicting the component rotated approximately 180 degrees.

FIG. 9 is an exploded, cross-sectional view of the component of FIGS. 8A and 8B and another component of the tool of FIG. 7 depicted in an assembled mode.

FIG. 10A is a cross-sectional view of the components of FIG. 9 shown in an assembled condition.

DETAILED DESCRIPTION

Figure 1:
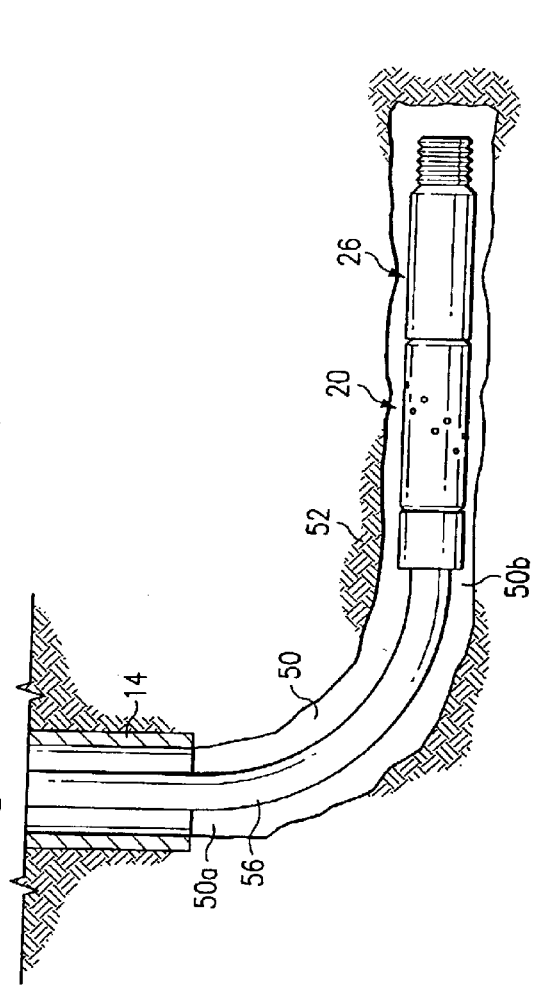
FIG. 1 is a sectional view of a fracturing apparatus according to an embodiment of the present invention, shown in a vertical wellbore.

Referring to FIG. 1, a stimulation apparatus according to an embodiment of the present invention is shown installed in an underground, substantially vertically-extending, wellbore 10 that penetrates a hydrocarbon producing subterranean formation 12. A casing 14 extends from the ground surface (not shown) into the wellbore 10 and terminates above the formation 12. The stimulation apparatus includes a workstring 16, in the form of piping or coiled tubing, that also extends from the ground surface and through the casing 14. The workstring 16 extends beyond, or below, the end of the casing 14 as viewed in FIG. 1, and one end of the workstring 16 is connected, if needed via an adapter sub 18, to one end of a tubular jet sub 20 in a manner to be described. The jet sub 20 has a plurality of through openings 22 machined through its wall that form discharge jets, or that receive discharge nozzles having discharge jets, as will be described in detail later.

The end of the workstring 16 at the ground surface is adapted to receive a stimulation fluid, to be described in detail, and a ball valve sub 26 is connected to the other end of the jet sub 20, also in a manner to be described. The ball valve sub 26 is normally closed to cause the stimulation fluid to discharge from the jet sub 20. An annulus 28 is formed between the inner surface of the wellbore 10 and the outer surfaces of the workstring 16 and the subs 20 and 26. Thus, when the stimulation fluid is pumped through the workstring 16, it enters the interior of the jet sub 20 and discharges through the openings 22 and the discharge jets into the annulus 28, and against the formation 12.

Figure 2:
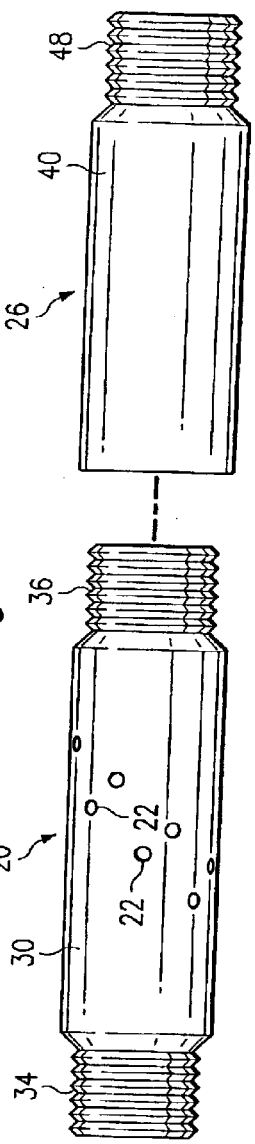
FIG. 2 is an exploded elevational view of two components of the apparatus of FIG. 1.

Details of the jet sub 20 and the ball valve sub 26 are shown in FIGS. 2 and 3. The jet sub 20 is formed by a tubular housing 30 that includes a longitudinal flow passage 32 extending through the length of the housing 30. The openings 22 extend through the wall of the housing 30 in one plane and can extend perpendicular to the axis of the housing 30 as shown in FIG. 2, and/or at an acute angle to the axis of the housing 30 as shown in FIG. 3, and/or aligned with the axis (not shown). Thus, the stimulation fluid from the workstring 16 enters the housing 30, passes through the passage 32 and is discharged from the openings 22. The stimulation fluid discharge pattern is in the form of a disc extending around the housing 30.

Two tubular nipples 34 and 36 are formed at the respective ends of the housing 30 and preferably are formed integrally with the housing 30. The nipples 34 and 36 have a smaller diameter than that of the housing 30 and are externally threaded. The adapter sub 18 is connected, at one end, to the workstring 16 in any conventional manner and its other end is internally threaded to receive the nipple 34 and thus attach the housing 30 to the workstring 16.

The ball valve sub 26 is formed by a tubular housing 40 that includes a first longitudinal flow passage 42 extending from one end of the housing 40 and a second longitudinal flow passage 44 extending from the passage 42 to the other end of the housing 40. The diameter of the passage 42 is greater than that of the passage 44 to form a shoulder between the passages, and a ball 46 extends in the passage 42 and normally seats against the shoulder.

An externally threaded nipple 48 extends from one end of the housing 40 for connection to other components (not shown) that may be used in the stimulation process, such as sensors, recorders, centralizers, and the like. The other end of the housing 40 is internally threaded to receive the externally threaded nipple 36 of the jet sub 20 to connect the housing 40 of the ball valve sub 26 to the housing 30 of the jet sub 20.

In operation, the ball 46 is dropped into the workstring 16 while the stimulation fluid is continuously pumped from the ground surface through the workstring 16 and the jet sub 20 and to the ball valve sub 26. The stimulation fluid includes a conventional acid that is used in squeezing or fracture acidizing, discussed above, along with various additives that are well known in the art. Typical fluids include mineral or organic acids, such as hydrochloric acid, formic acid, acetic acid, or a blend thereof. A more specific, but non-limiting, example of the type of fluid is a 28% hydrochloric acid containing gelling agents, corrosion inhibitors, iron-control chemicals, and chemicals for controlling sulfide cracking. Also, some sand and a foaming agent may be added to the fluid for reasons to be described. This mixture will hereinafter be referred to as "stimulation fluid."

In the ball valve sub 26, the ball 46 passes through the passage 42 and seats on the shoulder between the passages 42 and 44. The fluid pressure thus builds up in the subs 20 and 26, causing the stimulation fluid to discharge through the openings 22.

The pumping rate of the stimulation fluid is then increased to a level whereby the pressure of the stimulation fluid jetted through the openings 22 reaches a relatively high differential pressure and a high discharge velocity is achieved. As a result of the high pressure stimulation fluid from the interior of the housing 30 being forced out the relatively small openings 22, a jetting effect is achieved. This is caused by the stimulation fluid being discharged at a relatively high differential pressure, such as 3000–6000 psi, which accelerates the stimulation fluid to a relatively high velocity, such as 650 ft./sec. This high velocity stimulation fluid jetting into the wellbore 10 causes drastic reduction of the pressure surrounding the stimulation fluid stream (based upon the well known Bernoulli principle), which eliminates the need for isolation packers.

During the above operation, a gas, consisting essentially of carbon dioxide or nitrogen, is pumped from the ground surface and into the annulus 28 (FIG. 1). The gas flows through the annulus 28 and the stimulation fluid mixes with and carries the gas from the annulus 28 towards the formation 12 causing a high energy mixing to generate foam with the resulting mixture hereinafter being referred to as a "mixture."

The mixture is jetted towards the formation 12 and impacts the wall of the formation 12 forming the wellbore 10. The confined mixture will pressurize the cavities in the formation 12 and, as each of the cavities becomes sufficiently deep, the formation 12 will fracture when the pressure is sufficiently high. Paths for the mixture are created in the bottoms of the above cavities in the formation 12 which serve as output ports into the formation 12, with the annulus 28 serving as an input port to the system. Thus a virtual jet pump is created which is connected directly to the fracture. Moreover, each cavity becomes a small mixing chamber which significantly improves the homogeneity and quality of the foam. This high quality foam is then either pushed into the fracture or returned into the wellbore 10.

If the jet pressure and the pressure in the annulus 28 is not high enough to cause fracturing, and if this combined pressure is higher than the pore pressure in the formation 12, then "squeezing" will occur. Alternatively, if, after the fracturing discussed above, it is desired to squeeze, the pressure of the mixture in the annulus 28 is reduced to a squeeze level pressure which is higher than the pressure in the pores in the formation 12.

In either of the above cases, according to the squeezing process, a greater quantity of the mixture will go through the larger pores in the formation 12 than through the smaller pores, and the larger pores will be substantially increased in size to form channels or "wormholes" for the mixture to flow through. The presence of the foam in the mixture retards the reaction of the acid in the mixture with the formation 12 so that the reach of the mixture into the formation 12 is substantially extended when compared to techniques in which foam is not employed. Furthermore, the foam is of a high quality which increases the selectivity and effectiveness of the treatment. As the mixture in the wellbore 10 is pressurized against the wellbore 10 walls and fracture faces in the manner discussed above, the foam bubbles tend to plug the smaller pores while entering the larger pores so that the acid portion of the mixture reacts with the formation 12 material, thus further enlarging the larger pores. Thus, significant squeezing is achieved to create channels, also termed "fingering" or "wormholing," in the fracture faces and the wellbore 10 wall, with the reaction of the mixture with the formation 12 being relatively slow so that the mixture can penetrate deep into the formation 12 matrix. At the end of the squeeze, as the annulus 28 pressure is reduced, the fracture closes, and the flow back of the mixture to the wellbore 10 creates channeling or wormholes along the fracture face.

If it is desired to create a relatively large fracture, the pressure of the mixture in the annulus 28 around the jet sub 20 is controlled so that it is greater that the squeeze pressure, and slightly less than the hydraulic fracturing pressure, discussed above. The impact or stagnation pressure will bring the net pressure substantially above the required fracturing pressure; and therefore a substantially large fracture (such as 25 ft to 500 ft or more in length) can be created. In this process, the foam reduces mixture loss into the fracture face and/or the natural fractures. With the reduced loss of the mixture, most of the mixture volume can be used as a means for extending the fracture to produce the relatively large fracture. Since the fracture pressures are higher than the squeeze pressure discussed above, fingering of the mixture into the fracture face can occur simultaneously as discussed in the squeezing operation discussed above.

After the above operations, if it is desired to clean out foreign material such as debris, pipe dope, etc. from the wellbore 10, the workstring 16, and the subs 20 and 26, the pressure of the stimulation fluid in the workstring 16 is reduced and a cleaning fluid, such as water, at a relatively high pressure, is introduced into the annulus 28. After reaching a depth in the wellbore 10 below the subs 20 and 26, this high pressure cleaning fluid flows in an opposite direction to the direction of the stimulation fluid discussed above and enters the discharge end of the passage 44 of the valve sub 26. The pressure of the cleaning fluid forces the ball 46 out of engagement with the shoulders between the passages 42 and 44 of the ball valve sub 26. The ball 46 and the cleaning fluid pass through the passage 42, the jet sub 20, and the workstring 16 to the ground surface. This circulation of the cleaning fluid cleans out the foreign material inside the workstring 16, the subs 20 and 26, and the wellbore 10.

After the above-described cleaning operation, if it is desired to initiate the discharge of the stimulation fluid against the formation 12 wall in the manner discussed above, the ball 46 is dropped into the workstring 16 from the ground surface in the manner described above, and the stimulation fluid is introduced into the casing 14 as discussed above.

Figure 4:
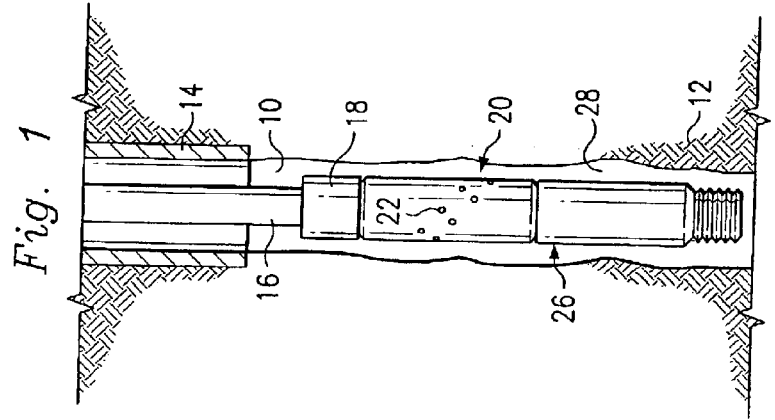
FIG. 4 is a sectional view of a fracturing apparatus according to an embodiment of the present invention, shown in a wellbore having a horizontal deviation.

FIG. 4 depicts a stimulation system, including some of the components of the system of FIGS. 1–3 which are given the same reference numerals. The system of FIG. 4 is installed in an underground wellbore 50 having a substantially vertical section 50a extending from the ground surface and a deviated, substantially horizontal section 50b that extends from the wellbore section 50a into a hydrocarbon producing subterranean formation 52. As in the previous embodiment, the casing 14 extends from the ground surface into the wellbore section 50a.

The stimulation system of FIG. 4 includes a workstring 56, in the form of piping or coiled tubing, that extends from the ground surface, through the casing 14 and the wellbore section 50a, and into the wellbore section 50b. As in the previous embodiment, stimulation fluid is introduced into the end of the workstring 56 at the ground surface (not shown). One end of the tubular jet sub 20 is connected to the other end of the workstring 56 in the manner described above for receiving and discharging the stimulation fluid into the wellbore section 50b and into the formation 52 in the manner described above.

The ball valve sub 26 is connected to the other end of the jet sub 20 and controls the flow of the stimulation fluid through the jet sub 20 in the manner described above. The respective axes of the jet sub 20 and the ball valve sub 26 extend substantially horizontally in the wellbore section 50b so that when the stimulation fluid is pumped through the workstring 56, it enters the interior of the jet sub 20 and is discharged, in a substantially radial or angular direction, through the wellbore section 50b and against the formation 52 to fracture and squeeze it in the manner discussed above. The horizontal or deviated section of the wellbore 50 is completed openhole and the operation of this embodiment is identical to that of FIG. 1. It is understood that, although the wellbore section 50b is shown extending substantially horizontally in FIG. 4, the above embodiment is equally applicable to wellbores that extend at an angle to the horizontal.

In connection with formations in which the wellbores extend for relatively long distances, either vertically, horizontally, or angularly, the jet sub 20, the ball valve sub 26 and workstring 56 can be initially placed at the toe section (i.e., the farthest section from the ground surface) of the well. The fracture acidizing and squeezing process discussed above can then be repeated numerous times throughout the horizontal wellbore section, such as every 100 to 200 feet. Alternatively, this process can be performed in a continuous manner by moving the workstring 56, and therefore the jet sub 20, relatively slowly and continuously towards the ground surface causing the jet sub 20 to be dragged through "hills" and "valleys" of the wellbore 50. When the jet sub 20 is at the top of the hill, i.e., when the discharge jets are almost touching the inner surface of the wellbore 50, a fracture occurs; when it is in a valley, fractures can not start. Also, squeezing will occur as discussed earlier.

The embodiment of FIG. 5 is similar to that of FIG. 1 and utilizes many of the same components of the latter embodiments, which components are given the same reference numerals. In the embodiment of FIG. 5, a casing 60 is provided which extends from the ground surface (not shown) into the wellbore 10 formed in the formation 12. The casing 60 extends for the entire length of that portion of the wellbore 10 in which the workstring 16 and the subs 20 and 26 extend. Thus, the casing 60, as well as the axes of the subs 20 and 26 extend substantially vertically.

Prior to the introduction of the stimulation fluid into the jet sub 20, a liquid mixed with sand is introduced into the jet sub 20 and discharges from the openings 22 in the jet sub 20 and against the inner wall of the casing 60 at a very high velocity, causing tiny openings to be formed through the inner wall. Then the operation described in connection with the embodiments of FIGS. 1–3 above is initiated, and the mixture of stimulation fluid and foamed gas discharge, at a relatively high velocity, through the openings 22, through the above openings in the casing 60, and against the formation 12 to fracture and squeeze it in the manner discussed above. Otherwise the operation of the embodiment of FIG. 5 is identical to those of FIGS. 1–4.

The embodiment of FIG. 6 is similar to that of FIG. 4 and utilizes many of the same components of the latter embodiments, which components are given the same reference numerals. In the embodiment of FIG. 6, a casing 62 is provided which extends from the ground surface (not shown) into the wellbore 50 formed in the formation 52. The casing 62 extends for the entire length of that portion of the wellbore 50 in which the workstring 56 and the subs 20 and 26 are located. Thus, the casing 62 has a substantially vertical section 62a and a substantially horizontal section 62b that extend in the wellbore sections 50a and 50b, respectively. The subs 20 and 26 are located in the casing section 62b and their respective axes extend substantially horizontally.

Prior to the introduction of the stimulation fluid into the jet sub 20, a liquid mixed with sand is introduced into the workstring 56 with the ball 46 (FIG. 3) in place. The liquid/sand mixture discharges from the openings 22 (FIG. 2) in the jet sub 20 and against the inner wall of the casing 62 at a very high velocity, causing tiny openings to be formed through the inner wall. Then the stimulation operation described in connection with the embodiments of FIGS.

1–3, above, is initiated with the mixture of stimulation fluid and foamed gas discharging, at a relatively high velocity, through the openings 22, through the above openings in the casing 62, and against the wall of the formation 52 to impact it in the manner discussed above. Otherwise the operation of the embodiment of FIG. 6 is identical to those of FIGS. 1–3 as disclosed in pending U.S. patent application Ser. No. 09/966,129 the disclosure of which is incorporated herein by reference in its entirety.

According to the embodiment of FIG. 7, the reference 70 refers, in general, to a tool which is designed for installation in relatively large-diameter wellbores. The tool 70 consists of a tubular jet sub 72 disposed at one end of the tool 70. The jet sub 72 can be identical to the jet sub 20 of the previous embodiments and, as such, has a series of discharge openings 74 formed through its wall that form discharge jets, or that receive jet nozzles (not shown) that have discharge jets. The openings 74 can be identical to the openings 22 of the previous embodiments. Thus, the stimulation fluid enters the jet sub 72 and is discharged from the openings 74 in the same discharge pattern as discussed above in connection with the embodiment of FIGS. 1–6.

A tubular adapter sub 80 is provided at the other end of the tool 70 and four serially connected, intermediate, tubular members 82, 84, 86, 88 are disposed between the jet sub 72 and the adapter sub 80. The member 82 is adapted to be connected to the jet sub 72, the member 84 is adapted to be connected to the member 82, the member 86 is adapted to be connected to the member 84, the member 88 is adapted to be connected to the member 86, and the adapter sub 80 is adapted to be connected to the member 88, all in a manner to be described.

The respective bores of the subs 72 and 80 and the members 82, 84, 86, and 88 are coaxially aligned to form a continuous flow passage for the stimulation fluid that is introduced into the adapter sub 80. This fluid can be identical to the stimulation fluid described above in connection with FIGS. 1–6 and flows through the above continuous flow passage and discharges from the discharge jets in the openings 74. Further details of this operation will be described.

The member 82 is shown in detail in FIGS. 8A, 8B, and 9 and consists of a tubular body member 90 having a reduced diameter mandrel 92 extending from one end thereof and formed integrally therewith. The bore of the body member 90 is larger than the bore of the mandrel 92 and the bores are coaxially aligned to form a continuous bore.

The member 82 has a locking mechanism that includes a ring 94 extending around the outer surface of the mandrel 92 in a spaced relation to the corresponding end of the body member 90. The ring 94 has a notch 94a formed therein (FIG. 8A) and a channel 94b extending therethrough (FIG. 8B) which is angularly spaced from the notch 94a. Preferably, the ring 94 is formed integrally with the mandrel 92.

A lug 90a is formed on the inner surface of the other end portion of the body member 90 and extends axially for a distance slightly less than the spacing between the ring 94 and the first-mentioned end of the body member 90, for reasons to be described. As shown in FIG. 9, the member 84 is identical to the member 82 and, as such, consists of a tubular body member 100 having a reduced diameter mandrel 102 extending from one end thereof and formed integrally therewith. The respective bores of the body member 100 and the mandrel 102 are coaxially aligned and, as such, form a continuous bore.

The member 84 also includes a locking mechanism including a ring 104 extending around the outer surface of the mandrel 102 in a spaced relation to the corresponding end of the body member 100. The ring 104 has a notch 104a formed therein and a channel 104b extending therethrough which is identical to the channel 94b of the member 82 and which is angularly spaced from the notch 104a. Preferably, the ring 104 is formed integrally with the mandrel 102. A lug 100a is formed on the inner surface of the other end portion of the body member 100 and extends axially for a distance slightly less than the spacing between the ring 104 and the first-mentioned end of the body member 100, for reasons to be described.

Referring to FIGS. 9 and 10A, three O-ring seals 106 are placed in three axially spaced grooves formed in the inner surface of the body member 90, and the member 84 is connected to the member 82 by inserting the mandrel 102 of the member 84 partially into the body member 90 of the member 82. The member 84 is then rotated relative to the member 82 (or vice versa) until the channel 104b in the ring 104 of the member 84 aligns with the lug 90a formed on the member 82. The mandrel 102 is then further inserted into the body member 90 in an axial direction until the lug 90a passes through the channel 104a, and the member 84 is then further rotated relative to the member 82 (or vice versa) until the 90a lug aligns with the notch 104a. In this position, as shown in FIG. 10A, the facing ends of their respective body members 90 and 100, respectively, are in a slightly spaced relationship. A lock ring 108 is disposed in the space between the latter ends to keep the lug 90a of the member 82 in the notch 104a of the member 84 and thus lock the members 82 and 84 against rotational movement. In this connected position, the outer surface of the mandrel 102 is slightly spaced from the corresponding inner wall of the body member 90 but may be in contact with the O-ring seals 106 to cause slight compression thereof. The lug 90a acts as a pivot or hinge to permit tilting movement of the member 82 relative to the member 84 as will be described in detail.

The members 86 and 88 are identical to the members 82 and 84 and the member 86 is connected to the member 84, and the member 88 is connected to the member 86 in the same manner as the member 84 is connected to the member 82 as described above. Additional lock rings 108 (FIG. 7) are disposed between the member 82 and the jet sub 72, between the members 86 and 84, between the members 88 and 86, and between the adapter sub 80 and the member 88.

It is understood that the corresponding end portion of the jet sub 72 is identical to the body members 90 and 100 and, as such, includes a lug, identical to the lugs 90a and 100a. Thus, the mandrel 92 of the member 82 can be inserted in, and locked relative to, the jet sub 72 in the same manner as discussed above. Also, it is understood that the adapter sub 80 has a mandrel identical to the mandrels 92 and 102 and, as such, is provided with a ring identical to the rings 94 and 104 so that the mandrel of the adapter sub 80 can be inserted in, and locked relative to, the member 88 in the same manner as discussed above. It is further understood that the adapter sub 80 is adapted to be connected to the adapter sub of a section of coiled tubing, a component of a workstring, or the like, in a conventional manner to connect the tool to the coiled tubing or component.

Figure 10B:
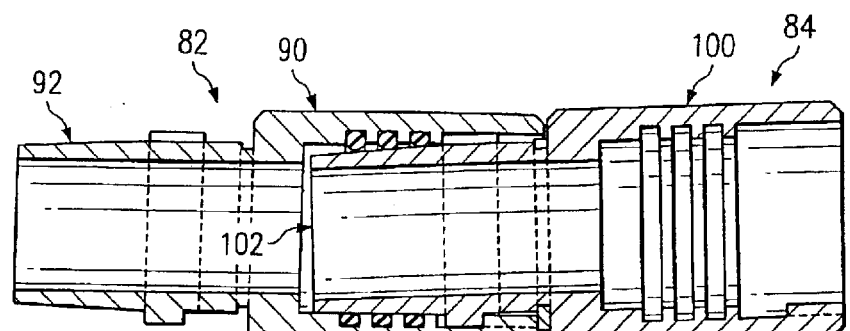
FIG. 10B is a view, similar to FIG. 10A but depicting one of the components tilted relative to the other.

Referring to FIG. 10B, the members 82, 84, 86, and 88 are constructed and arranged to tilt relative to each other to enable the tool 70 to form an arc and the jet sub 72 to thus move from the axis of the tool 70. To this end, that portion of the outer diameter of the mandrel 102 of the member 84 extending from the ring 104 to the distal end of the mandrel 102 is tapered radially inwardly from the ring 104 to the distal end. This permits relatively tilting movement between the members 82 and 84 with the lug 90a of the member 84 acting as a hinge, or pivot point.

The lugs 90a and 100a of the members 82 and 84 respectively, as well as the lugs associated with the jet sub 72, and the members 86 and 88 are aligned with the discharge jets in the openings 74; and the jet sub 72 and members 82, 84, 86, and 88 are tilted in the above manner by discharging the stimulation fluid at a relatively high pressure into the tool 70 so that the pressure of the fluid creates forces that cause the tilting.

In particular, the stimulation fluid, which may be identical to the fluid in the embodiments of FIGS. 1–6, is introduced into the adapter sub 80 of the tool 70 at a relatively high pressure which fluid flows to the end of the jet sub 72 and pressurizes the tool 70 internally before the fluid is discharged from the discharge jets in the openings 74 in the jet sub 72. As a result of the high pressure stimulation fluid from the interior of the jet sub 72 being forced out the relatively small openings 74, a jetting effect is achieved. This is caused by the stimulation fluid being discharged at a relatively high differential pressure, such as 3000–6000 psi, which accelerates the stimulation fluid to a relatively high velocity, such as 650 ft./sec. This high velocity stimulation fluid jetting into the wellbore causes drastic reduction of the pressure surrounding the stimulation fluid stream (based upon the well known Bernoulli principle), which eliminates the need for isolation packers.

The pumping rate of the stimulation fluid is then increased to a level whereby the pressure of the stimulation fluid jetted through the openings 74 of the jet sub 72 reaches a relatively high differential pressure and high discharge velocity such as those set forth above. This discharge of the high pressure fluid from the openings 74 causes a reaction force and a reaction moment based on the reaction force. The reaction force is exceeded by a tilting force and tilting moment caused by the internal pressure of the fluid acting against the member 82 that tends to pivot, or tilt relative to the member 84 about the lug 90a. The design is such that this tilting force and moment is greater than the reaction force to cause the member 82 to tilt relative to the member 84 in a direction opposite the direction of the reaction force or in the direction of discharge of the fluid from the discharge jets in the openings 74. Assuming that each member 82, 84, 86, and 88 will tilt approximately 3–4 degrees as described above, the design is such that the above bending moment exceeds the above jet reaction moment, to enable a proper tilting to be achieved.

Therefore, and with reference to FIGS. 10A and 10B, the above bending moments impart forces that tend to move the members 82 and 84 away from each other longitudinally. The lug 90a of the member 82, by virtue of extending in the notch 104a of the member 84, inhibits rotational movement between the members 82 and 84 as well as longitudinal movement between the respective wall portions of the members 82 and 84 near the lug 90a, while the respective wall portions of the latter members opposite the lugs are forced longitudinally away from each other, which force is greater than the moment arm created by the reaction forces of the fluid discharging from the discharge jets in the openings 74 in the jet sub 72. This, plus the clearance between the tapered mandrel 102 of the member 84 and the body member 90 of the member 82, permits the member 82 to tilt relative to the member 84 for a relatively small angle. The members 84, 86, and 88 tilt in the same manner, and it can be appreciated that the amount of tilt of each member 82, 84, and 86, and therefore the movement of the jet sub 72 from the original axis of the tool 70, can be calculated based on a number of parameters including the number of members, the length and inner diameters of each member, the diameters of the discharge jets of the openings or discharge nozzles, the number of jets, the distance of the discharge jets from the center of rotation, the fluid pressure in the tool 70, etc. This tilting technique is further disclosed in applicant's U.S. Pat. No. 6,213,205 the disclosure of which is incorporated herein by reference in its entirety.

During the above operation, a gas, consisting essentially of carbon dioxide or nitrogen, is pumped from the ground surface and into the annulus. The gas flows through the annulus and the stimulation fluid mixes with and carries the gas from the annulus towards the formation causing a high energy mixing to generate foam and improve the fracturing in the same manner as discussed in connection with the embodiment of FIGS. 1–6.

Figure 11:
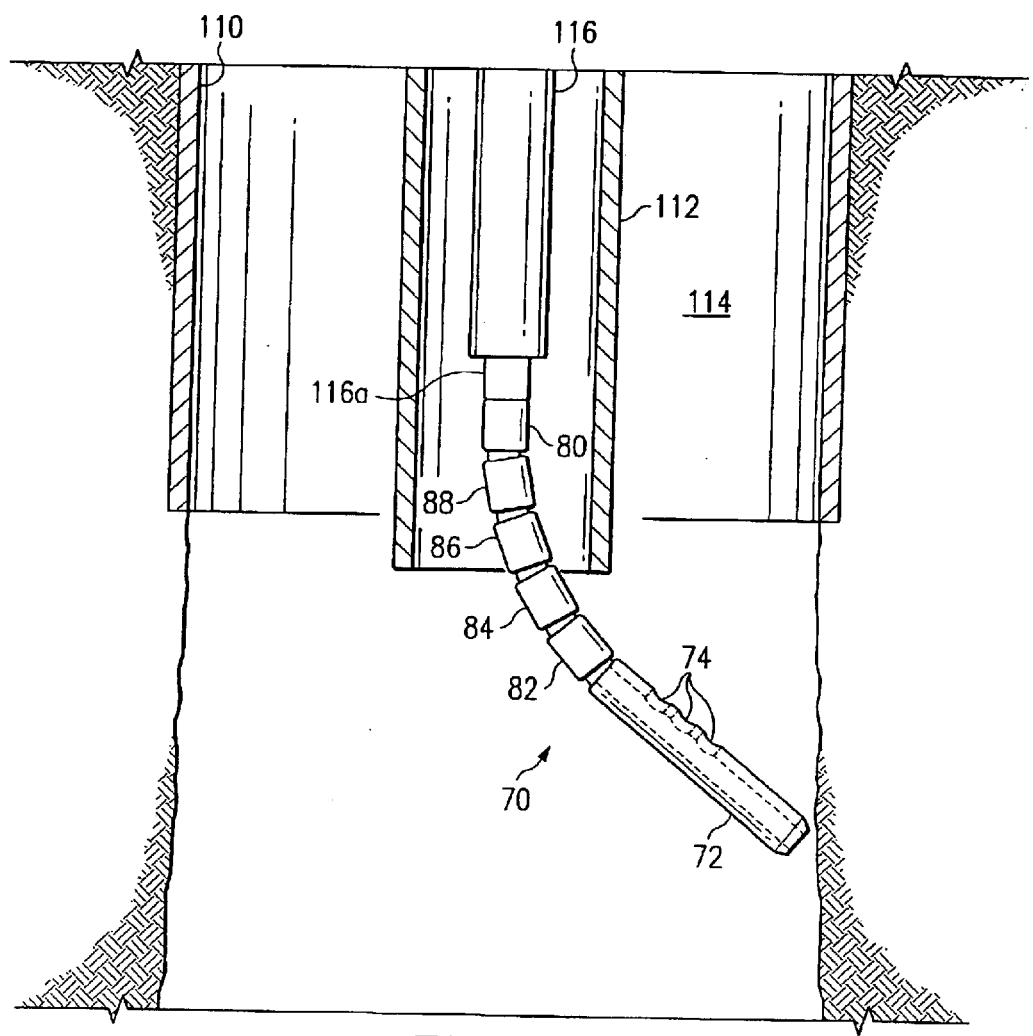
FIG. 11 is a partial elevational/partial sectional view of the tool of FIG. 7 inserted in a wellbore.

FIG. 11 depicts a wellbore penetrating a hydrocarbon producing formation and a casing 110 inserted in the wellbore. A section of production tubing 112 is disposed in the casing 110 and has an outer diameter that is considerably smaller than the outer diameter of the casing 110 to form a relatively large annulus 114.

A section of coiled tubing 116 is inserted in the tubing 112 and has an adapter sub 116a extending from its leading end. The tool 70 is connected to the coiled tubing 116 by connecting the adapter sub 116a of the coiled tubing 116 to the adapter sub 80 of the tool 70 in the manner discussed above.

The stimulation fluid, which can be identical to the fluid utilized in the embodiments described above is passed through the coiled tubing 116 and therefore through the tool 70. The relatively high pressure stimulation fluid is forced out from the interior of the jet sub 72 through the relatively small openings 74 to achieve a jetting effect as discussed above. This is caused by the stimulation fluid being discharged at a relatively high differential pressure which accelerates the stimulation fluid to a relatively high velocity. This high velocity stimulation fluid jetting into the wellbore causes drastic reduction of the pressure surrounding the stimulation fluid stream (based upon the well known Bernoulli principle), which eliminates the need for isolation packers.

The pumping rate of the stimulation fluid is then increased to a level whereby the pressure of the stimulation fluid jetted through the openings 74 of the jet sub 70 reaches a relatively high differential pressure and high discharge velocity such as those set forth above.

This discharge of the relatively high pressure fluid through the openings 74 causes the member 88 to tilt relative to the adapter sub 80, the member 86 to tilt relative to the member 88, the member 84 to tilt relative to the member 86, and the member 82 to tilt relative to the member 84 in the manner discussed above. This tilting of the members 82, 84, 86, and 88 is cumulative so that the members 82, 84, 86, and 88 together form an arc to direct the jet sub 72 radially outwardly from the original axis of the tool 70 and towards the wall of the wellbore in a direction corresponding to the direction of discharge of the fluid from the discharge jets. Thus, the pressurized fluid in the jet sub 72 can discharge from the discharge jets at a location much closer to the wall of the wellbore and thus significantly improve the fracturing technique discussed above.

During the above operation, a gas, consisting essentially of carbon dioxide or nitrogen, is pumped from the ground surface and into the annulus 114. The gas flows through the annulus 114 and the stimulation fluid mixes with and carries the gas from the annulus 114 towards the formation causing a high energy mixing to generate foam and fracture in the same manner as discussed in connection with the embodiment of FIGS. 1–6.

Figure 12:
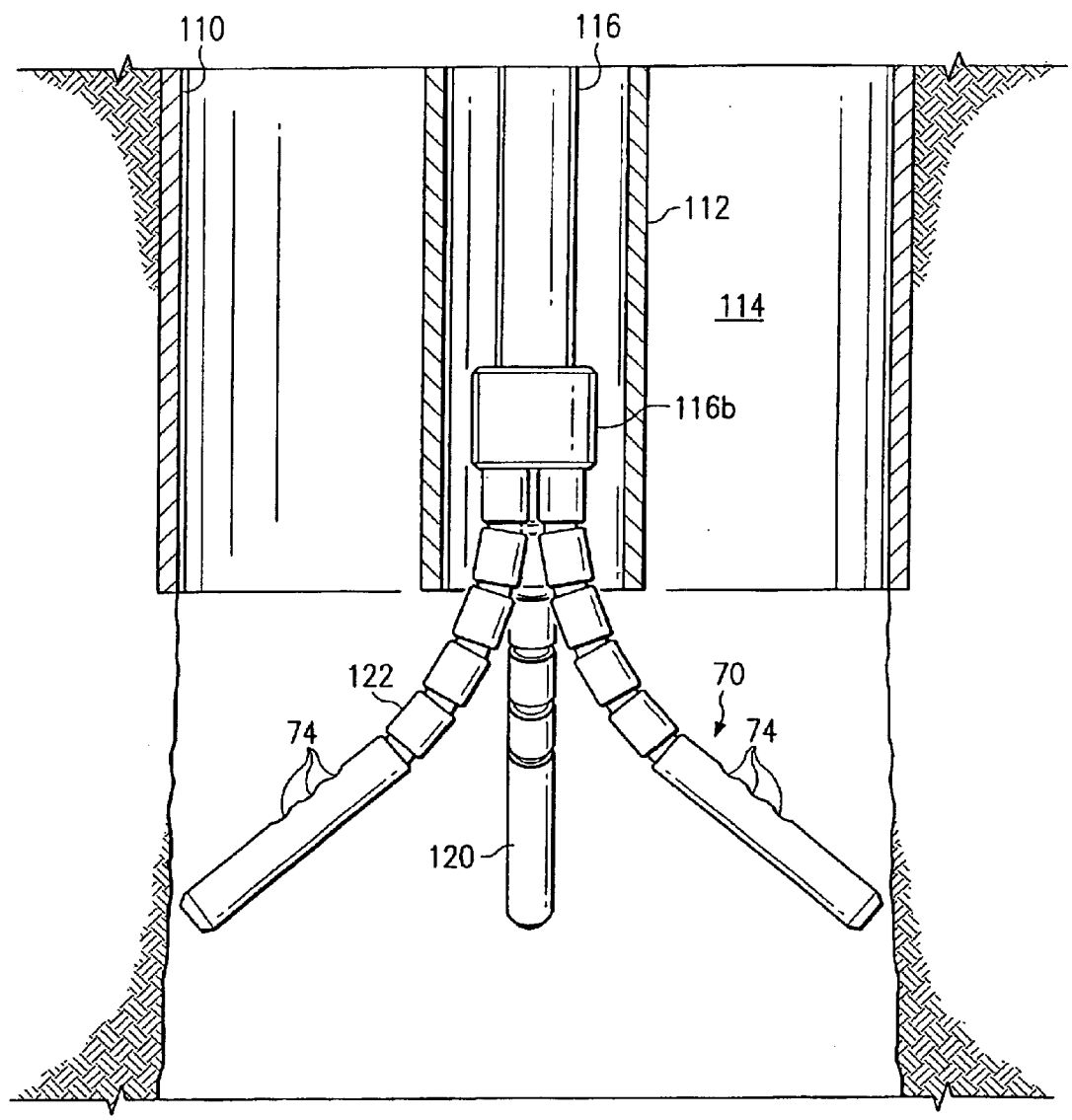
FIG. 12 is a view similar to that of FIG. 11 but depicting an alternate arrangement utilizing the tool of FIG. 7.

The arrangement of FIG. 12 is similar to that of FIG. 11 and includes the same components of FIG. 11 which are given the same reference numerals. According to the embodiment of FIG. 12, an adapter sub 116b extends from the leading end of the coiled tubing 116 and is larger in diameter than the adapter sub 116a of the arrangement of FIG. 11. The tool 70 is connected to the coiled tubing 116 by connecting the adapter sub 116b of the coiled tubing 116 to the adapter sub 80 of the tool 70 in the manner discussed above. Two additional tools 120 and 122, which are identical to the tool 70, are connected to the coiled tubing 116 by connecting their respective adapter subs to the adapter sub 116b. The tools 120 and 122 are arranged so that, when they receive the high pressure fluid from the coiled tubing 116, they tilt in the manner discussed above, and in the direction shown in FIG. 12 so that they are angularly spaced approximately 120 degrees from the tilted tool 70 and from each other.

Thus, the fluid is discharged from the discharge jets in the openings 74 of the tool 70 and from the discharge jets in the openings of the tools 120 and 122 in the manner discussed above in connection with the openings 74. During this operation, a gas, consisting essentially of carbon dioxide or nitrogen, is pumped from the ground surface and into the annulus 114. The gas flows through the annulus 114 and the stimulation fluid mixes with and carries the gas from the annulus 114 towards the formation causing a high energy mixing to generate foam and improve the fracturing in the same manner as discussed in connection with the embodiment of FIGS. 1–6.

Equivalents and Alternatives

The casings 14 and 110 and the production tubing 112 are not necessary to the operation of the tools 20, 70, 120, and 122, but rather the tools can be inserted directly in the wellbore and activated, in the manner discussed above.

The gas flowing in the annuluses 28 and 114 can be premixed with some liquids prior to entering the wellbore for many reasons such as cost reduction and increasing hydrostatic pressure.

The makeup of the stimulation fluid can be varied within the scope of the invention. For example the fluid can be an non-acid fluid such as disclosed, for example, in U.S. patent application Ser. No. 09/966,128 the disclosure of which is incorporated herein by reference in its entirety.

The particular orientation of the wellbores can vary from completely vertical to completely horizontal.

Jet nozzles could be installed in the openings 22 and 74 in the jet subs 20 and 72, respectively, which are made of exotic materials such as carbide mixtures for increased durability.

The fluid pressures and discharge velocities were recited in connection with the above embodiments for example only and can be varied depending on the particular operation.

A variety of other fluids can be used in the annulus 28, including cleaning, liquids that chemically control clay stability, and plain, low-cost fluids.

Additional members, identical to the members 82, 84, 86, and 88, can be added to the tools 70, 120 and 122 in order to increase the reach of the jet sub 72 and the jets subs of the tools 120 and 122 to reach the casing 110 or the wellbore wall.

The tool 70, as well as the tools 120 and 122, can be used to extend into deviated wellbores, such as the wellbores in FIGS. 4 and 6 in the manner described in the above-identified patent.

Additional discharge openings can also be formed through the jet sub 72 of the tool 70 and the jet subs of the tools 120 and 122 which are angularly spaced from the openings 74 and which form discharge jets, or that receive discharge nozzles having discharge jets.

One or more additional discharge openings can be formed through the jet subs 20 and 72 which are angularly spaced approximately 180 degrees from the discharge openings 22 and 74 as long as the number of additional openings are less than the number of openings 22 and 74.

In the embodiment of FIGS. 7–12, the lugs can be formed on the outer surface of the mandrels, and the ring, notch, and channel can be formed on the inner surfaces of the body members.

The ball valve sub 26 of the embodiment of FIGS. 1–6 is optional and is generally required for allowing emergency reverse circulation processes, such as during screenouts, equipment failures, etc.

A ball valve sub, identical to the ball valve sub 26 can be used in the embodiments of FIGS. 7–12.

The stimulation fluid can contain a gel rather than acid, as well as any other fluids known in the fracturing technology.

Other conventional components, such as centering devices, BOPs, strippers, tubing valves, anchors, seals, etc. can be associated with the workstring in each of the above embodiments.

Although only a few exemplary embodiments of this invention have been described in detail above, those skilled in the art will readily appreciate that many other modifications are possible in the exemplary embodiments without materially departing from the novel teachings and advantages of this invention. Accordingly, all such modifications are intended to be included within the scope of this invention as defined in the following claims.

What is claimed is:

1. A method of treating a subterranean formation, comprising the steps of:

providing a tool with a plurality of members that tilt relative to each other;

inserting the tool into a wellbore penetrating the formation so that the tool is substantially coaxially aligned with the axis of the wellbore and in a spaced relation to a wall of the wellbore;

introducing a pressurized fluid into the members to cause relative tilting between two or more of the members to move one of the members in a direction away from the axis and towards the wall; and discharging the fluid from the tool at a pressure sufficient to treat the formation.

2. The method of claim 1 further comprising the step of pumping a gas in an annulus between the tool and the wellbore so that the discharged fluid mixes with the gas to generate a foam mixture that is directed towards the formation.

3. The method of claim 2 wherein the fluid comprises an acid to react with the formation to form channels in the formation, and wherein the foam mixture retards the reaction of the acid in the foam mixture with the formation.

4. The method of claim 1 wherein the pressure of the fluid is sufficient to form a fracture in the formation.

5. The method of claim 4 wherein the foam mixture is forced into the fracture to further extend the fracture.

6. The method of claim 1 wherein forces caused by the pressure of the fluid in the tool causes the relative tilting.

7. The method of claim 1 further comprising the step of locking one member to another member.

8. The method of claim 1 further comprising the step of connecting one of the members to an end of a section of coiled tubing for lowering the tool into the wellbore.

9. The method of claim 1 wherein:
the plurality of members comprises a first and second member;
at least a portion of the first member extends into a bore of the second member in a coaxial relationship; and
the first member has a diameter less than that of the bore of the second member to permit relative tilting between the first and second members.

10. A tool for use in a wellbore, comprising:
a first member having an internal bore and a locking member; and
a second member having an internal bore and a locking member;
wherein:
at least a portion of the second member extends into the first member in a coaxial relationship with their respective locking members in engagement;
the second member has a diameter less than that of the bore of the first member to permit relative tilting between the first and second members while their respective locking members prevent relative axial and rotational movement between the first and second members;
the first and second members can be inserted into the wellbore such that the first and second members are substantially coaxially aligned with the axis of the wellbore and in a spaced relation to a wall of the wellbore; and
fluid introduced into the first and second members can tilt one of the members relative to the other and in a direction away from the axis and towards the wall.

11. The tool of claim 10 further comprising a jet sub connected to the first member for discharging the fluid towards the wall.

12. The tool of claim 11 wherein the water perforates a casing in the wellbore.

13. The tool of claim 11 wherein the water fractures a subterranean formation penetrated by the wellbore.

14. The tool of claim 10 further comprising an adapter for connecting the second member to an end of a section of coiled tubing for lowering the first and second members into the wellbore.

15. The tool of claim 10 wherein:
the locking member of the first member comprises a lug;
the locking member of the second member comprises a ring having a channel formed therein;
the first and second members can be aligned and rotated so that the lug aligns with the channel;
the first member can be inserted into the second member so that the lug passes through the channel; and
the first and second members can be rotated again so that the lug engages the ring to prevent axial movement between the first and second members.

16. The tool of claim 15 wherein the locking member of the second member further comprises a notch formed in the ring, and wherein the lug engages the notch to angularly align the first and second members.

17. The tool of claim 15 wherein the ring is formed on the outer surface of the second member and the lug is formed on the inner surface of the first member.

18. A tool for use in a wellbore, comprising:
a first member having an internal bore;
a second member having a diameter less than that of the bore to permit tilting of the second member relative to the first member; and
a locking mechanism to permit the tilting while preventing axial and rotational movement between the members.

19. The tool of claim 18 wherein the locking mechanism comprises:
an ring formed on the second member and having a channel formed therein; and
a lug formed on the first member;
wherein:
the members can be aligned and rotated so that the lug aligns with the channel;
the first member can be inserted into the second member so that the lug passes through the channel; and
the members can be rotated again so that the lug engages the ring to prevent axial movement between the members.

20. The tool of claim 19 wherein a notch is formed in the ring, and wherein the lug engages the notch to angularly align the members.

21. The tool of claim 19 wherein the ring is formed on the outer surface of the second member and the lug is formed on the inner surface of the first member.

22. A method of treating a subterranean formation, comprising the steps of:
inserting a tool in a wellbore penetrating the formation so that the tool is substantially coaxially aligned with the axis of the wellbore and in a spaced relation to a wall of the wellbore;
tilting a portion of the tool in a direction away from the axis and towards the wall;
introducing pressurized fluid into the tool; and
discharging the fluid from the tool at a pressure sufficient to treat the formation.

23. The method of claim 22 further comprising the step of pumping a gas in an annulus between the tool and the wellbore so that the discharged fluid mixes with the gas to generate a foam mixture that is directed towards the formation.

24. The method of claim 23 wherein the fluid comprises an acid to react with the formation to form channels in the formation, and wherein the foam mixture retards the reaction of the acid in the foam mixture with the formation.

25. The method of claim 24 wherein the retardation of the acid reaction causes extension of the channels.

26. The method of claim 23 wherein the pressure of the fluid is sufficient to form a fracture.

27. The method of claim 26 wherein the foam mixture is forced into the fracture to further extend the fracture.

28. The method of claim 26 wherein the fluid comprises an acid to react with the formation to form channels in the fracture faces, and wherein the foam mixture retards the reaction of the acid in the foam mixture with the formation.

29. The method of claim 28 wherein the retardation of the acid reaction causes extension of the channels.

30. The method of claim 26 further comprising the step of reducing the pressure of the fluid after the formation of the fracture to a value between the fracturing pressure and the pore pressure in the formation.

31. The method of claim 26 further comprising the step of reducing the pressure of the fluid to allow closure of the fracture.

32. The method of claims 31 wherein, after the fracture closes, the foam mixture flows out from the fracture and creates channels in walls of the fracture.

33. The method of claim 23 wherein the pressure of the fluid is not sufficient to form a fracture and the foam mixture is forced into pores of the formation.

34. The method of claim 22 wherein the tool comprises a plurality of members, and wherein two or more of the members tilt relative to each.

35. The method of claim 34 wherein at least a portion of one of the members having a diameter less than that of a bore of another member extends into the bore in a coaxial relationship to permit relative tilting between the members.

36. The method of claim 34 wherein forces caused by the pressure of the fluid in the tool causes the relative tilting.

37. The method of claim 34 wherein one of the members is locked to another member.

* * * * *